(12) United States Patent
Biddle et al.

(10) Patent No.: US 8,135,135 B2
(45) Date of Patent: Mar. 13, 2012

(54) SECURE DATA PROTECTION DURING DISASTERS

(75) Inventors: Peter N. Biddle, Seattle, WA (US); Kenneth D. Ray, Seattle, WA (US); Octavian T. Ureche, Redmond, WA (US); Erik Holt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 969 days.

(21) Appl. No.: 11/635,897

(22) Filed: Dec. 8, 2006

(65) Prior Publication Data

US 2008/0141040 A1 Jun. 12, 2008

(51) Int. Cl.
*H04L 9/14* (2006.01)
(52) U.S. Cl. .................................. 380/286; 713/193
(58) Field of Classification Search .................. None
See application file for complete search history.

(56) References Cited

U.S. PATENT DOCUMENTS

| | | | | |
|---|---|---|---|---|
| 5,841,865 | A * | 11/1998 | Sudia | 380/286 |
| 5,850,451 | A * | 12/1998 | Sudia | 380/286 |
| 6,052,797 | A | 4/2000 | Ofek et al. | |
| 6,212,280 | B1 * | 4/2001 | Howard et al. | 380/279 |
| 6,442,690 | B1 * | 8/2002 | Howard et al. | 713/175 |
| 6,496,949 | B1 | 12/2002 | Kanevsky et al. | |
| 6,802,029 | B2 | 10/2004 | Shen et al. | |
| 6,928,551 | B1 * | 8/2005 | Lee et al. | 713/165 |
| 6,986,050 | B2 * | 1/2006 | Hypponen | 713/183 |
| 6,990,605 | B2 | 1/2006 | Noda et al. | |
| 7,020,697 | B1 * | 3/2006 | Goodman et al. | 709/223 |
| 7,039,660 | B2 | 5/2006 | Kitsuregawa et al. | |
| 7,596,696 | B1 * | 9/2009 | Perlman | 713/165 |
| 2004/0093555 | A1 | 5/2004 | Therrien et al. | |
| 2004/0228493 | A1 * | 11/2004 | Ma | 380/286 |
| 2004/0230817 | A1 | 11/2004 | Ma | |
| 2005/0238175 | A1 * | 10/2005 | Plotkin et al. | 380/281 |
| 2005/0262097 | A1 | 11/2005 | Sim-Tang et al. | |
| 2006/0123208 | A1 | 6/2006 | Johnson | |
| 2006/0129562 | A1 | 6/2006 | Pulamarasetti et al. | |
| 2006/0149991 | A1 | 7/2006 | Guzman et al. | |

OTHER PUBLICATIONS

Keeton et al., "Designing for disasters", Date: Mar. 31-Apr. 2, 2004, USENIX Association, San Francisco, CA, USA, http://www.usenix.org/publications/library/proceedings/fast04/tech/full_papers/keeton/keeton.pdf.

Meissner et al., "Design Challenges for an Integrated Disaster Management Communication and Information System", Date: Jun. 24, 2002, http://www.ipsi.fraunhofer.de/~risse/pub/P2002-01.pdf.

Patterson et al., "SnapMirror: File System Based Asynchronous Mirroring for Disaster Recovery", Date: 2002, Article No. 9, USENIX Association, Berkeley, CA, USA, http://portal.acm.org/citation.cfm?id=1083323.1083335.

Rohde et al., "Disaster recovery planning for academic computing centers", Date: Jun. 1990, pp. 652-657, vol. 33, Issue 6, ACM Press, New York, US, http://portal.acm.org/citation.cfm?doid=78973.78975.

* cited by examiner

*Primary Examiner* — Gilberto Barron, Jr.
*Assistant Examiner* — Shaun Gregory

(57) ABSTRACT

In situations, such as disasters, where the physical protection of data may be compromised, algorithmic protection of such data can be increased in anticipation of the disaster. An off-site mechanism can send a disaster preparation script to computing devices expected to be affected, resulting in the deletion of decryption keys from those computing devices. Once the disaster passes, the off-site mechanism, upon receiving confirmation of the physical integrity of the computing devices, can return one or more decryption keys to the computing devices, enabling access algorithmically protected data. The off-site mechanism can also optionally provide access information that can be used to obtain access to the algorithmically protected data via at least one returned decryption key.

14 Claims, 7 Drawing Sheets

SECURE DATA PROTECTION DURING DISASTERS

BACKGROUND

Digital data protection traditionally encompasses both physical protection of digital media and algorithmic protection. Physical protection includes the security of the building or office where the digital data is stored and accessed. Physical protection also includes elements such as computer locks and motion alarms attached to the computing device. Algorithmic protection is traditionally based on encryption mechanisms where the data to be protected is encrypted in such a manner that it is not meaningful in its encrypted state.

The information which can decrypt the encrypted data is known as a "decryption key." Decryption keys comprise binary data and are selected so that it is difficult for an unauthorized user to guess the key, and thereby decrypt the data. However, such keys may not be easy for user's to remember or enter. Consequently, a decryption key can be protected in a form easier for the user to access. In some cases, the original key can itself be encrypted and another decryption key can be used to decrypt the original decryption key. In these cases that subsequent decryption key can itself be protected with hardware that can validate data that is more easily accessible to a user, such as a user-selected password, a user-selected PIN, biometric information that is specific to the user, such as a fingerprint, or other user accessible data. Alternatively, the subsequent decryption key can be protected with hardware that can merely validate the state of the machine itself. The subsequent decryption key can also be protected by the direct cryptographic expansion of user supplied data, such as with a pass phrase. To access algorithmically protected data, the user would enter their password, for example, which would decrypt the key that had encrypted the data the user seeks to access. Once decrypted, that key can be used to decrypt the protected data, thereby providing access to the protected data.

In theory, physical protection and algorithmic protection provide redundant protection of digital data. For example, a computing device that is isolated in a secure building will, theoretically, not require algorithmic protection, since there is no physical mechanism or connection by which the data stored on such a computing device can be accessed. Likewise, data that is protected by algorithmic protection does not, in theory, require physical protection since the data will be inaccessible even if physical access to the data was obtained.

Theoretical protection, however, does not equate to "real world" protection. In practice, even isolated computing devices in secure locations can be accessed by unintended individuals. For example, users can accidentally leave doors unlocked and gates unattended. Likewise, determined individuals can often bypass common physical security mechanisms, such as locks and sensors. Algorithmic protection similarly does not, in practice, provide unbreakable data security. Passwords may be chosen poorly or stored in such a way that they can be easily obtained. Encryption relies on mathematical algorithms that can be reverse engineered or otherwise deciphered. Likewise, software can have bugs and flaws that when discovered can allow the security mechanisms to be subverted.

Consequently, most protection of digital data comprises a combination of physical and algorithmic protection. More specifically, the physical and algorithmic protections are selected in advance to an appropriate level of protection while providing sufficient ease of use for the intended user of the digital data being protected. For example, digital data can be physically protected by locking the corresponding computing device or storage medium to various office furniture while providing a key to the intended user. Likewise, digital data can be algorithmically protected by selecting a secure data encryption mechanism while enabling the intended user to decrypt the data through a password selected by the user. In each case, the level of protection, such as the type of lock or data encryption algorithm, is selected in advance based upon various factors including projected usage patterns, user sophistication, physical constrains and other factors.

SUMMARY

In certain situations, the physical protection of digital data can be severely compromised. To compensate for the degradation, or possible degradation, of any physical protection offered to digital data, the algorithmic protection of such data can be strengthened. In practice, the physical protection of digital data will most likely be compromised by a disaster, including environmental disasters and civil disasters. For example, a hurricane or flood can destroy buildings, disable alarm systems and otherwise enable almost anyone to physically access various computing devices that were previously in a physically secure location. Likewise, a revolution or rioting can enable individuals to destroy physical protections without immediate repercussions, thereby enabling them access to computing devices that were, up until that moment, physically secured.

If it is determined that a disaster may affect, or is currently affecting, protected data, additional steps can be taken to strengthen the algorithmic protection of that data. In particular, the decryption keys can be removed from the computing device. As indicated, the decryption keys enable decryption of the protected data. Such decryption keys are traditionally themselves protected by a series of mechanisms that ultimately enable a user to access the protected data by entering information that is "user-friendly", such as a password, PIN or biometric information. If the protected decryption keys are removed from the computing device, either by removing any storage that a piece of hardware uses to store the keys it is protecting, or by removing any copies of those keys, then, even if access information is obtained, such as a user's password or PIN, or even if a hardware validation mechanism is subverted, the protected data would still remain inaccessible since the keys needed to decrypt the protected data are no longer on the computing device and cannot, therefore, be accessed, even with the user's password, or even with a subverted hardware validation mechanism.

Once the disaster passes, an off-site mechanism can verify that the computing device is physically secure. That verification can be digital, such as by including network authentication mechanisms in the boot code of the computing device, or the verification can be through more conventional means, such as by having the user call an off-site service, or even sending an inspector to physically verify the integrity of the computing device. Once the computing device has been verified to be physically secure, at least one copy of a protected original decryption key can be copied back to the computing device. If the user possesses the access information associated with that protected decryption key, the user can then obtain access to the decryption key using the appropriate mechanism and can, thereby, again be granted access to the protected data. If the user does not possess the access information that is associated with the protected decryption key that was copied back to the computing device, the user will still not have access to the protected data until the user is first provided, such as by an administrator, the information needed to access the protected encryption key. Alternatively, all of the protected encryption keys can be copied back to the computing device to ensure that the user has the same access to the protected data as they did prior to the disaster.

In some situations, it may be desirable to only copy back to the computing device a protected decryption key that can only be accessed with information that is maintained off-site. By maintaining both the protected decryption key and the information used to access it, an off-site mechanism can retain further control over the accessibility of the protected data after the disaster. In one embodiment, a recovery key can be generated when the protected data is first encrypted. The decryption key can be protected in such a manner that the recovery key can, via the relevant mechanisms, access it and, thereby, provide access to the protected data. However, unlike a user-generated password, the recovery key can be exclusively maintained at an off-site location.

If sufficient time is provided in advance of any pending disaster, even data that has not yet been algorithmically protected can be encrypted and the necessary decryptors can be centrally stored before being removed from the computing device. Likewise, if there is concern that, after a disaster, the current users of the protected data may no longer be trusted, the protected data can be re-encrypted and the necessary decryptors can be exclusively retained at an off-site location and can be removed from the computing device. After the disaster, the necessary decryptors can be copied back to the computing device and provided to trusted individuals. Ultimately, the level of algorithmic protection can be selected based on the anticipated, or feared, degradations in the physical protections due to the impending disaster.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
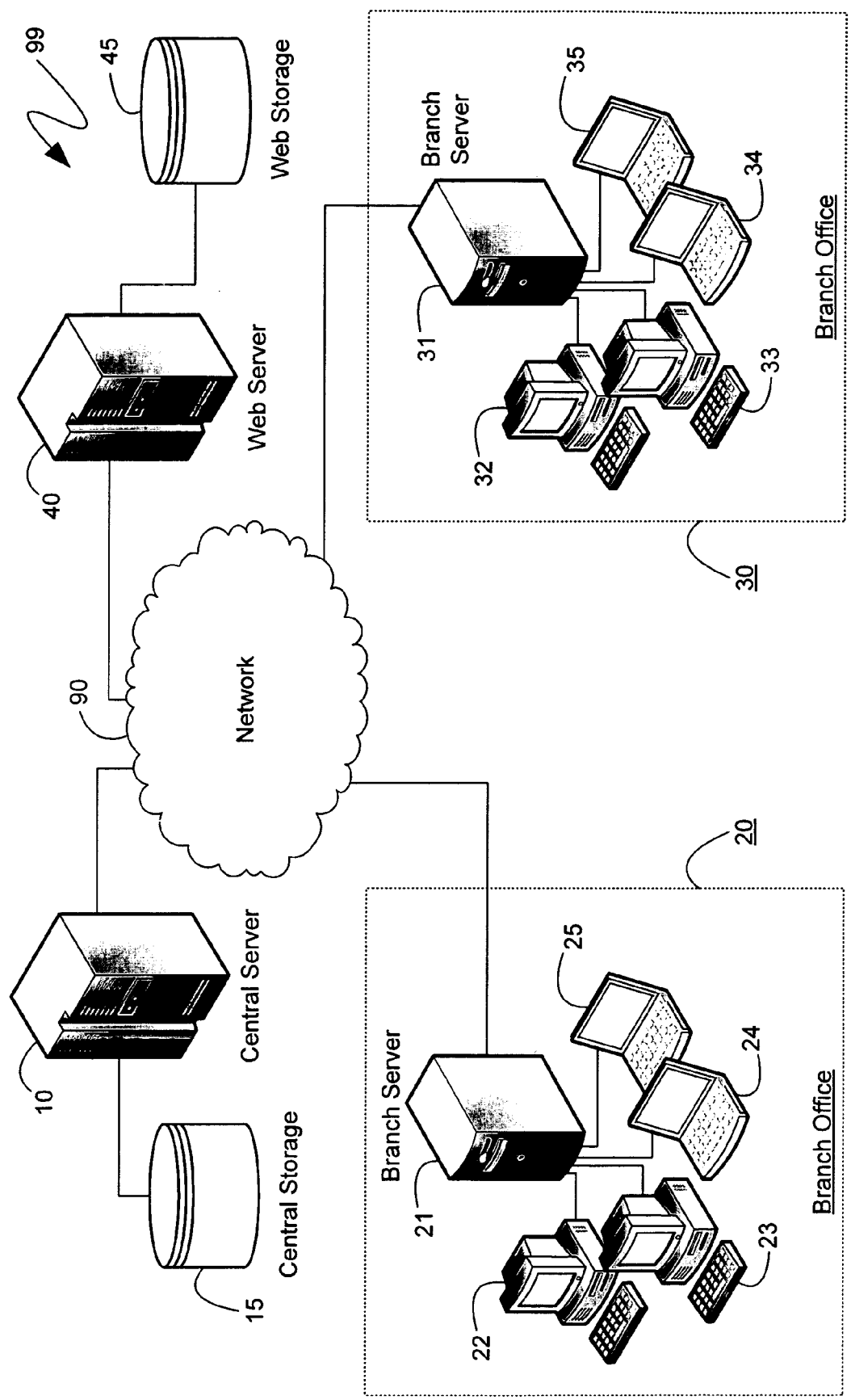
FIG. 1 is a block diagram of an exemplary network environment.

The following description relates to mechanisms for preparing for an adverse impact on the physical security of a computing device by strengthening the algorithmic security of the digital data on that computing device. A "disaster" can be any event that adversely impacts the physical security of a computing device, including natural disasters, including hurricanes, floods, tidal waves, volcanoes and other natural events that can be predicted with some degree of accuracy, and civil disasters, including riots, revolutions, terrorist attacks, military action and other civil events for which advanced warning can be obtained.

In one embodiment, an off-site mechanism, such as a central administrator, a Web-based service, or any other computing device not subject to the same disaster, can prepare those computing devices that are physically proximate to an anticipated disaster. The preparation can entail verification that appropriate information from each computing device is stored at the off-site location, and can further entail the removal of appropriate information from each computing device. The removal of information from each computing device can strengthen the algorithmic security of any protected data on such a computing device.

In another embodiment, after the disaster, or threat of disaster, has passed, the off-site mechanism can verify the physical integrity of the computing devices affected by the disaster. One form of verification can be network communication, such as the communication of a shared secret or some other information that could only be transmitted if the computing devices affected by the disaster were still physically secured. Another form of verification can rely on human communication, such as a phone call to provide information that only an authorized user or remote administrator would know. Yet another form of verification can use in-person verification, whereby an individual from an off-site management location physically inspects the remote location to verify the physical integrity of the remote computing devices.

Once the physical integrity of the remote computing devices is verified, the off-site mechanism can replace, or provide for the first time, appropriate information to the computing devices affected by the disaster to enable authorized users to access algorithmically protected data on those computing devices.

The techniques described herein focus on, but are not limited to, the information that is removed from a computing device in preparation for a disaster, the information that is returned to the computing device after a disaster, mechanisms for removing and subsequently returning that information, and mechanisms for verifying the physical integrity of the computing device. With respect to the information removed from a computing device, in one embodiment such information comprises all protected decryption keys, where a decryption key is the key that can decrypt the protected data. In an alternative embodiment, only some of the protected decryption key are removed, leaving others as a backup or fail-safe. Likewise, after the disaster, the information that is returned to the computing device comprises, in one embodiment, all of the protected decryption keys that were previously present. In an alternative embodiment, only some of the previously present protected decryption keys are returned. In yet a further alternative embodiment, the information required to access at least one protected decryption key is likewise provided after the disaster.

Turning to FIG. 1, an exemplary system 99 is illustrated, comprising, in part, a central server 10, a web server 40, a collection of computing devices at branch office 20 and an analogous collection of computing devices at branch office 30. Each of the central server 10, the web server 40 and the computing devices of the branch offices 20 and 30 are interconnected through a network 90, which can include one or more other interconnected computing devices that are not shown in FIG. 1. A central storage 15 and a web storage 45 are shown apart from central server 10 and the web server 40, respectively, for illustration purposes only, and can comprise storage hardware that is either external or internal to the central server and web server, respectively. Likewise, for illustration only, each branch office, including branch office 20 and 30, is shown with a single branch server computing device, two desktop computing devices and two portable computing devices. Each branch office, however, is not limited to a single server, a specific number of desktop or portable computing devices, nor is each branch office limited to a single connection to the network 90.

Branch offices 20 and 30 are remotely located from each other, the central server 10, and the web server 40. To minimize the communicational overhead, individual branch servers, such as branch server 21 and 31 can communicate with the central server 10, the web server 40, or with each other and act as an interface for the computing devices at the various branch offices, such as computing devices 22-25 and 32-35. For example, within the context of the descriptions below, if it was determined that a disaster was likely to affect a branch office, such as branch office 20, the central server 10, the web server 40, or even the branch server 31 could communicate the necessary requests and instructions to the branch server 21 and the branch server would then carry out those requests and instructions with respect to computing devices 22-25. Thus, while portable computing devices 24 and 25 may not even be connected to the network 90 at the time that the requests and instructions are received by the branch server 21, the branch server can verify that the portable computing devices are subject to the requests and instructions when they subsequently connect to the branch server. Descriptions below, therefore, that refer to communications to or from any one or more of the computing devices 22-25 and 32-35 should be taken as encompassing communications that can include communications to or from a branch server, such as branch servers 21 and 31, and should be taken as encompassing both real-time and delayed-response communications.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing devices, as the mechanisms may also be practiced in distributed computing environments where tasks are performed by remote processing devices that are linked through a communications network. In a distributed computing environment, program modules may be located in both local and remote memory storage devices.

Figure 2:
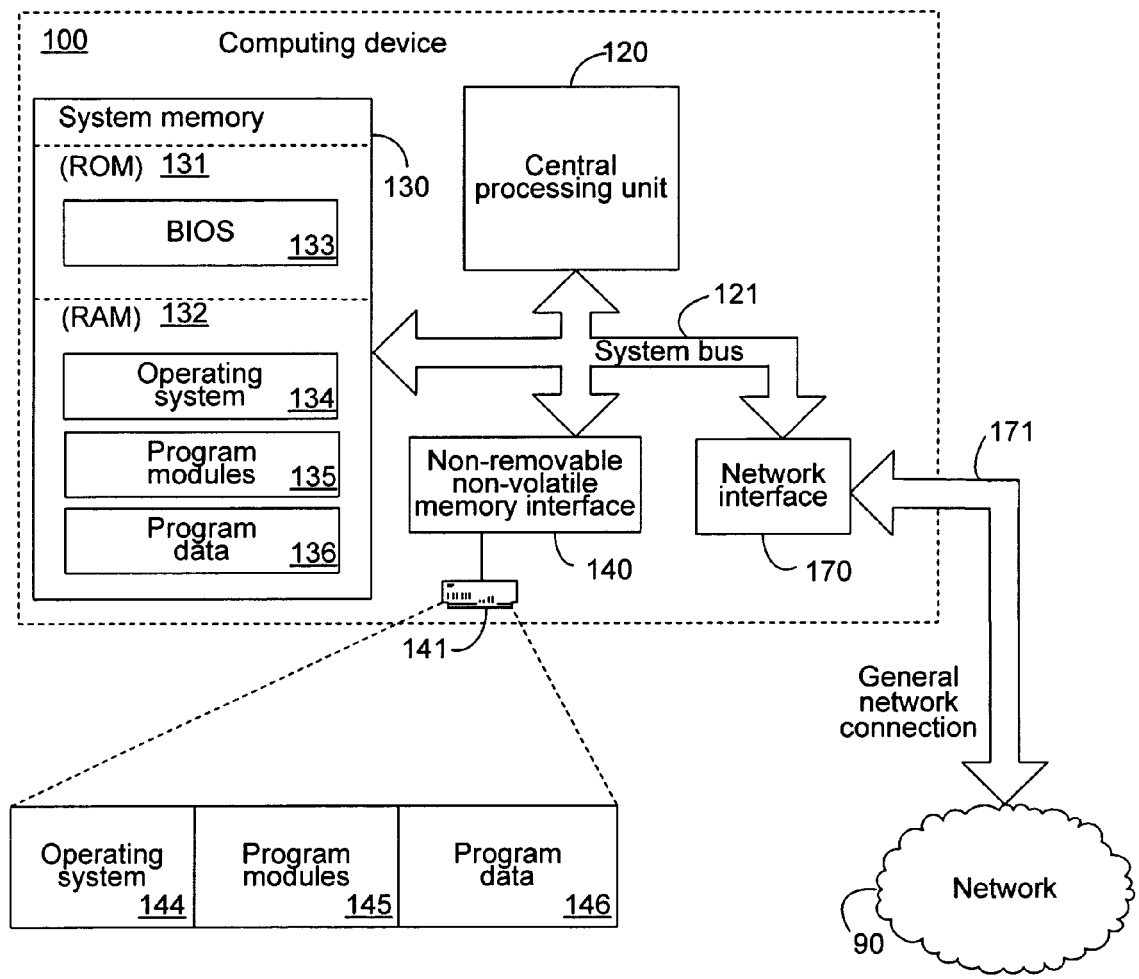
FIG. 2 is a block diagram of an exemplary computing device.

With reference to FIG. 2, an exemplary computing device 100 is illustrated. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates an operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG.

2, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, the computing device 100 is shown in FIG. 2 to be connected to a network 90 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link may be used.

To protect the data stored on the computer readable media, such as the hard disk drive 141, of the computing device 100, the computing device can be physically protected and algorithmic protection can be applied to the data. To physically protect the computing device 100, it can be located in a restricted-access environment, an environment that is guarded by automated monitoring equipment, an environment that is guarded by security personnel, or any combination thereof. Computing device 100 can also be physically protected by locking hardware, such as appropriately attached cables and locks, and it can be physically protected via the use of specialized electronics attached to the computing device, such as a motion sensor attached to a computing device designed to activate an alarm when the computing device is moved without proper deactivation of the motion sensor.

Figure 3:
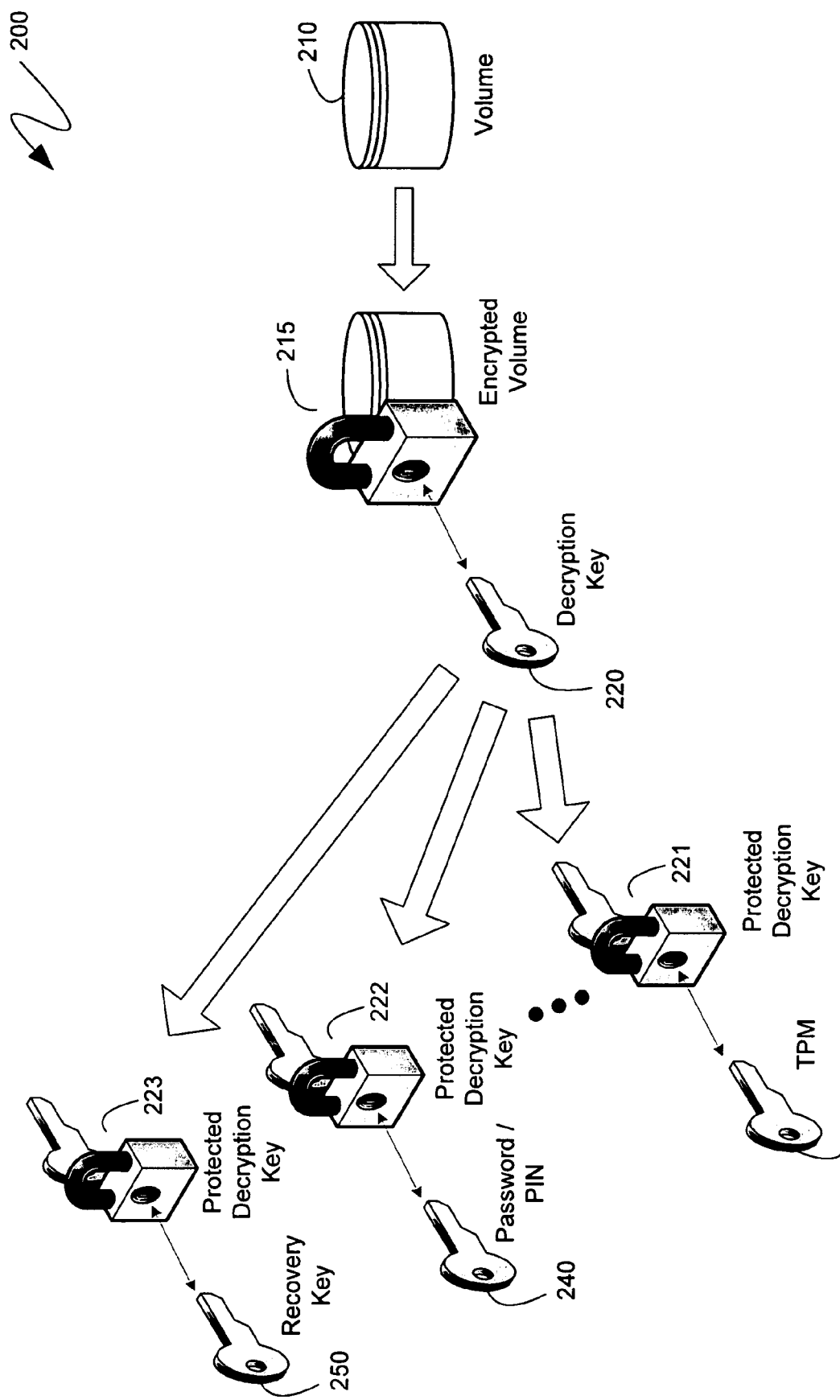
FIG. 3 is a conceptual diagram illustrating the relationships between various encrypted data and the corresponding encryptors.

Algorithmic protection of data generally comprises encryption of the data, and, consequently, the descriptions below will be directed to encryption. Nevertheless, the mechanisms described are equally applicable to other forms of algorithmic protection in a manner well known to those skilled in the art, and the application is equally directed to such other algorithmic protections. Turning to FIG. 3, a conceptual illustration 200 visualizes one example of how a set of data, such as the volume 210, can be algorithmically protected via data encryption. The volume 210 can be a partition of the hard disk drive 141, representing only some of the available data storage space of the hard disk drive, or the volume can be the only volume of the hard disk drive, thereby representing all of the available data storage space of the hard disk drive. The volume 210 can likewise represent some or all of the available data storage space of any other computer storage medium attached to computing device 100.

The data of volume 210 is encrypted by transforming the data into a form that is not meaningful to any process other than the decryption process. Such a transformation occurs in accordance with established mathematical algorithms known to those skilled in the art, and often uses one or more unique data elements known as "keys." To transform the encrypted data back into its original, unencrypted state, a unique set of data, known as a "decryption key" is used in combination with other established mathematical algorithms. FIG. 3 illustrates the encryption of the data of volume 210 into the encrypted volume 215, along with a decryption key 220 that can "unlock" the encrypted data.

The decryption key 220 is generally selected, not by a user of the computing device 100, but rather by the encryption algorithms used to generate encrypted volume 215. Consequently, the decryption key 220 often comprises 128 or more bits of data that can be very difficult for a human user to remember or easily provide each time that they desire to access the data of volume 210. Decryption keys can be protected with a mechanism which is easier for a user to access than requiring the user to type in all the bits of a given decryption key. In some cases the original decryption key can itself be encrypted and another decryption key can be used to decrypt the original decryption key. In these cases that subsequent decryption key can itself be protected with hardware that can validate data that is more easily accessible to a user, such as a user-selected password, a user-selected PIN, biometric information that is specific to the user, such as a fingerprint, other user accessible data, or merely validating state of the machine itself. Examples of such hardware include smart cards, biometric scanners, Trusted Platform Modules (TPMs), or any other piece of hardware designed to restrict access to a secret. In yet others that key can be protected by the direct cryptographic expansion of user supplied data, such as a pass phrase.

FIG. 3 provides a simplified illustration of the protection of a decryption key 220. As shown in FIG. 3, the decryption key 220 can be protected by various protected decryption keys 221, 222 and 223. In one embodiment, a protected decryption key, such as protected decryption key 223, can be merely an encrypted version of the decryption key 220. In another embodiment, a protected decryption key, such as protected decryption key 222 can be an encrypted version of a decryption key that decrypts an encrypted version of the decryption key 220. Thus, the arrows illustrated in FIG. 3, relating various protected decryption keys 221, 222 and 223 to the decryption key 220 are meant to represent any chain of one or more links of protection. Similarly, the protected decryption keys 221, 222 and 223 are exemplary only and, as illustrated by the use of the ellipsis, any number of protected decryption keys can be created for any given decryption key 220.

For each different protected decryption key 221, 222 or 223, there is corresponding access information that enables access of the decryption key 220 from the protected decryption key. For example, a password or PIN 240, selected by a user such that the user can remember it, can be used to access the decryption key 220 by way of the protected decryption key 222.

Additional protected decryption keys can be generated such that the decryption key 220 can be obtained, and the encrypted volume 215 can be decrypted, even if the user forgets their password. Protected decryption key 221 represented the protection of the decryption key 220 such that it can be accessed by using TPM data 230 provided by a Trusted Platform Module (TPM). As will be known by those skilled in the art, a TPM comprises hardware attached to the computing device 100 that can monitor the systems of the computing device and can provide secure data. By protecting the decryption key 220 with protected decryption key 221, a backup is provided if the user forgets their password 240 and cannot, therefore, access the protected decryption key 222. Likewise, a protected decryption key 223 can be generated that can enable access of the decryption key 220 though a recovery key 250 that can be maintained with an administrator, or at an off-site location, such as the central storage 15 or web storage 45.

Figure 4:
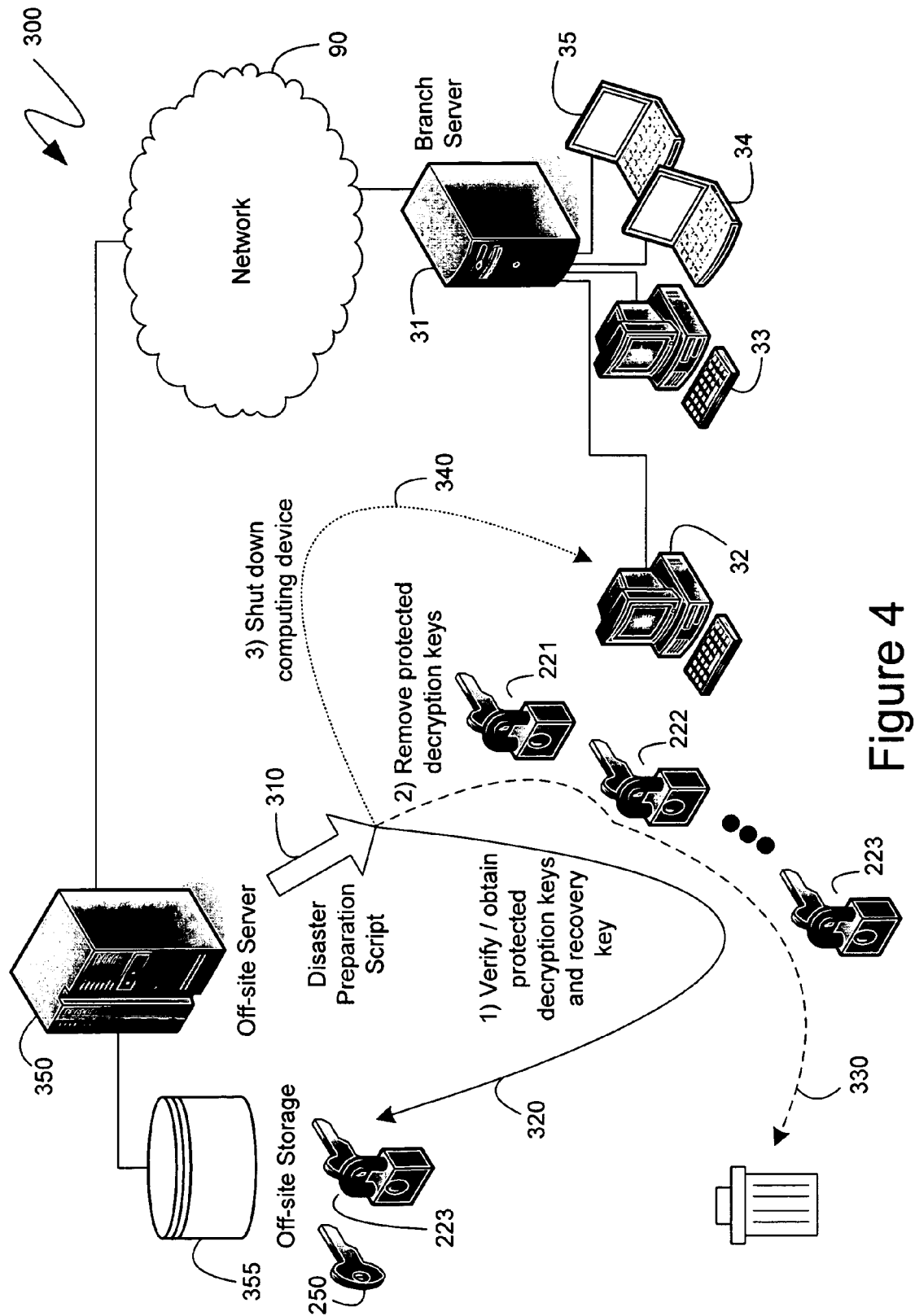
FIG. 4 is a conceptual diagram illustrating a disaster preparation process.

Turning to FIG. 4, a communicational diagram 300 is shown, illustrating the preparation for a disaster according to one embodiment. Specifically, as shown, an off-site server 350, upon determining that a disaster is likely to occur at one or more locations, such as branch office 30, can proceed to prepare the computing devices located in that location. The off-site server 350 can be the central server 10, the web server 40, or another branch server, such as branch server 21. Because a disaster can entail a breach of any physical protection of data, the off-site server 350 can attempt to strengthen the algorithmic protections of such data until physical protections can be verified again. As shown in FIG. 4, the off-site server 350 can transmit, via network 90, a disaster preparation message or script 310. The disaster preparation script 310 is illustrated as being transmitted directly to computing device 32 only for simplicity of illustration. As explained previously, the central server 10 can communicate directly with individual end-user computing devices, such as devices 32-35, or it can communicate with intermediate servers, such as branch server 31, thereby leaving to the branch server 31 the task of properly communicating the disaster preparation script 310 to the end-user computing devices 32-35.

As an initial step, the disaster preparation script 310 can verify that the off-site server 350 has available to it, such as via an off-site storage 355, sufficient information to access the decryption key 220 for each computing device 32-35 at the branch office 30. The off-site storage 355 can be the central storage 15, the web storage 45, storage associated with another branch server, such as branch server 21, or any other storage that should not be impacted by the relevant disaster. Thus, mechanism 320 can review one or more of the protected decryption keys 221, 222 and 223 stored on computing device 32, for example, and can verify that at least one protected decryption key for the computing device 32 is stored in the off-site storage 355. Mechanism 320 can further verify that at least one key 250 associated with a protected decryption key 223 is likewise stored in the off-site storage 355. If the off-site storage 355 comprises no protected decryption key for the computing device 32, or comprises an outdated protected decryption key, the mechanism 320 can copy a protected decryption key 223 and corresponding access information, such as key 250, to the off-site storage 355.

In an alternative embodiment, the protected decryption key stored at the off-site storage need not correspond to a protected decryption key stored at the computing device 32, such as protected decryption keys 221, 222 and 223. For example, when a volume 210 of the computing device 32 was first encrypted, the decryption key 220 could have been protected by mechanisms that would allow its access using a specific recovery key. That protected decryption key and the corresponding recovery key could have automatically been stored in the off-site storage 355 and need not ever have been stored on the computing device 32.

A further mechanism 330 of the disaster preparation script 310 can subsequently strengthen the algorithmic protection of data stored at the computing devices that are expected to be affected by the anticipated disaster. More specifically, mechanism 330 can remove some or all of the protected decryption keys, such as protected decryption keys 221, 222 and 223, from the computing devices 32-35. Without the protected decryption keys, even if a proper access information, such as a user password, was obtained, there would be no protected decryption key data through which the decryption key could ultimately be obtained. And without the decryption key 220, the encrypted volume 215 cannot be properly decrypted. Consequently, the deletion of some or all of the protected decryption keys provides a strengthening of the algorithmic protection of the data on the computing device.

In one embodiment, all of the protected decryption keys, such as protected decryption keys 221, 222 and 223, are removed from computing device 32 by mechanism 330. In an alternative embodiment, only some of the protected decryption keys, such as protected decryption keys 221 and 222, are removed, while at least one protected decryption key, such as protected decryption key 223, is left on the computing device 32 as a fail-safe, in case the remaining protected decryption keys cannot be restored back onto the computing device after the disaster. The protected decryption key 223 that is left on the computing device 32 can require a recovery key 250 in order to ultimately access the decryption key 220, and the recovery key 250 need not have been previously stored on the computing device or known to any authorized users, but instead could have been exclusively retained by the off-site server 350.

Once some or all of the protected decryption keys have been removed from the computing device, mechanism 340 issues a shut down command, causing the computing device 32 to shut down. Once shut down, the algorithmically protected data cannot be properly accessed without the consent of the off-site server 350. Consequently, with the increased algorithmic protection, the protected data can withstand a breach of its physical protection due to the anticipated disaster.

Figure 5:
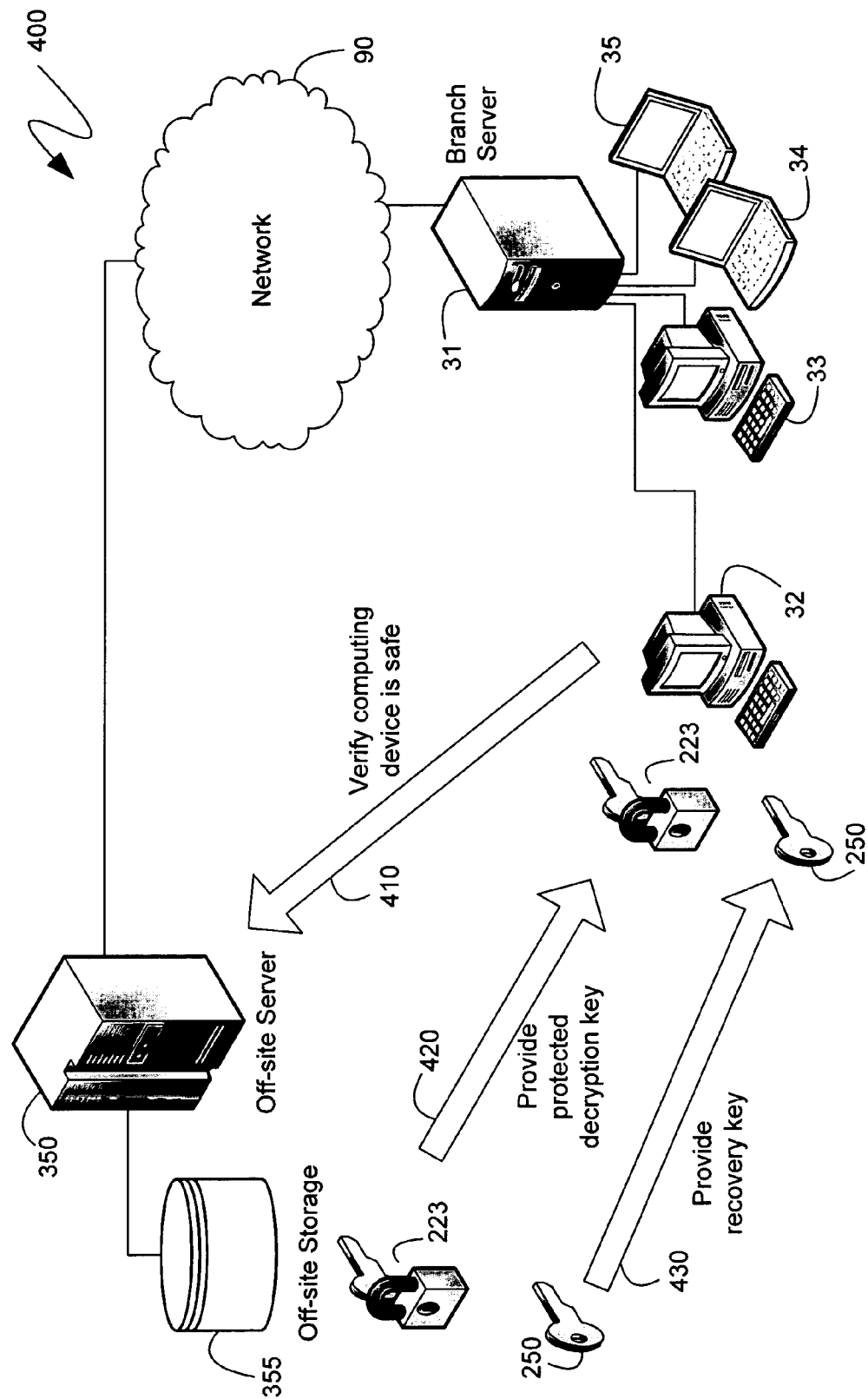
FIG. 5 is a conceptual diagram illustrating a disaster recovery process.

Once a disaster passes, the computing devices at the location affected by the disaster may again be physically secured. FIG. 5 illustrates a communicational diagram 400 comprising communications that can be used to decrease the algorithmic protection of data to previous levels, which were more efficient for common usage. As shown in FIG. 5, each of the computing devices at the affected location, such as computing devices 32-35, can initially verify that they are safe via communications 410 to the off-site server 10.

In one embodiment, communications 410 can be computer-to-computer network communications. For example, each of the computing devices 32-35 can have booting instructions stored in ROM 131 that attempt to access the decryption key 220 through various means. If such booting instructions cannot access the decryption key 220, such as because some or all of the protected decryption keys have been removed, the booting instructions can establish a network connection with the off-site server 350 whereby an authorized user can enter a shared secret to verify that the computing devices 32-35 are safe. For example, an administrator of a branch office, such as branch office 20 or 30, can be provided with specific passwords or PINs which are to be used only when recovering from a disaster. Such identifiers, transmitted over the network connection established by the booting instructions can verify to the off-site server 350 that the computing devices 32-35 are safe.

In an alternative embodiment, the verification communication 410 can comprise human-to-human communication. For example, the administrator of the branch office 30 can place a telephone call to an appropriate representative and can thereby provide relevant information to enable the off-site server 350 to verify that the computing devices 32-35 are safe. As a further alternative, verification communication 410 can comprise an in-person visit, such as by an inspector.

Once the off-site server 350 has verified that the computing devices remain safe, it can provide at least one protected decryption key to each computing device via communication 420. As before, while communications 410, 420 and 430 are illustrated as occurring directly between off-site server 350 and computing device 32, they can likewise pass through the network 90 and the branch server 31 such that the off-site server need only deliver the communication to the branch server, offloading to the branch server the task of delivering the communication to the ultimate destination computing device.

In one embodiment, only a single protected decryption key, such as protected decryption key 223, is returned to the computing device 32. The protected decryption key 223 that is returned to the computing device 32 can be a protected decryption key that was previously on the computing device, or it can be a protected decryption key that was only stored at the off-site server 350. In the case of the former, it may not be necessary for the off-site server 350 to provide any further information because an authorized user may already know the relevant information that can, through the protected decryption key that was returned to the computing device, provide access to the decryption key 220. In the case of the latter, the off-site server 350 can, via communications 430, further provide the key 250 with which access to the decryption key 220 can be obtained through the protected decryption key that was returned to the computing device.

In an alternative embodiment, not illustrated in FIG. 5, communication 420 can return all of the protected decryption keys, such as protected decryption keys 221, 222 and 223, that were previously stored on the computing device 32. In such a case, the user could simply use their password, for example, to access the decryption key 220, since whatever protected decryption key was associated with the user's password would have been replaced on the computing device 32. Put differently, the user's password would again "just work" once communication 420 was properly received by the computing device 32 and the computing device 32 was restarted. Furthermore, while the off-site server 350 can optionally provide one or more keys, such as the recovery key 250, those keys would likely be unnecessary if all of the protected decryption keys were returned.

Figure 6:
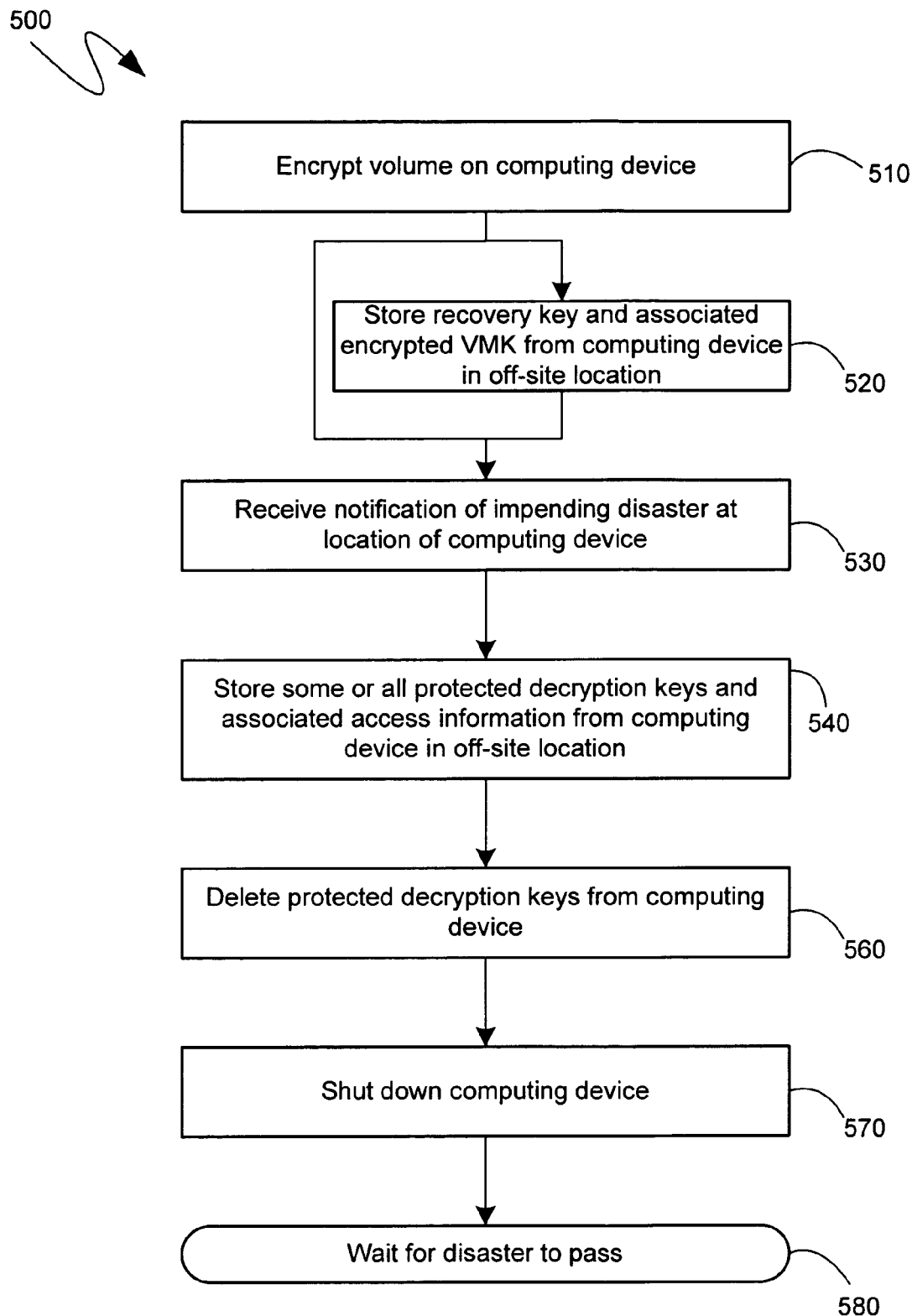
FIG. 6 is a flow diagram illustrating a disaster preparation process.

Flow diagram 500 of FIG. 6 illustrates the above described mechanisms within the context of a flow chart. Initially, preferably at a time prior to the determination that a disaster is imminent, data on a computing device expected to be affected by the disaster can be algorithmically protected. Thus, step 510 is directed to the encryption of a logical volume of data on the computing device. The volume need not have been previously unencrypted. For example, in situations where the employees of the office may themselves become untrusted during, or after, a disaster, the computing device can be instructed to first decrypt the currently encrypted volume and then subsequently re-encrypt it, now generating a new decryption key that would not be known to the employees of the office.

Once the volume is encrypted at step 510, the decryption key used for decrypting the volume can be protected and, at step 520, the protected decryption key and corresponding information needed to access the decryption key via the protected decryption key can be stored in the off-site storage 355. In one embodiment, the protected decryption key and corresponding access information can have been stored in the central storage at the time that the volume was encrypted at step 510. In an alternative embodiment, step 520 can be performed as part of the preparation for a forecast disaster, such as in response to a disaster preparation script 310 received from the central server 10. In yet another alternative embodiment, the protected decryption key and corresponding access information can be designed only for a single-use, namely the protection of data during a disaster. After the disaster, once normal access to the protected data is restored, the protected decryption key and corresponding access information can be discarded. The recovery key 250, and corresponding encrypted version of the VMK 223, can be used either uniquely by the off-site server 350, or they can be used by the computing device as well, and merely be copied to the off-site server 350 when requested. Additionally, if sufficient time remains, the data of the computing device can be backed up to an off-site location. Such an off-site backup can be performed in combination with a re-encryption of the protected data to provide a single-use decryption key.

If a notification of an impending disaster, such as the disaster preparation script 310, was not received prior to step 520, it can be received at step 530, triggering the performance of either step 540. In step 540, the off-site server 350 can copy one or more protected decryption keys and, optionally, the associated access information that would provide access to the decryption key 220 through the copied protected decryption keys. Because step 520 is optional, step 540 can copy only one protected decryption key and the associated access information, such as a recovery key. Alternatively, at step 540, the off-site server 350 can copy all of the protected decryption keys so that, after the disaster, the computing device can be returned into the same condition, with respect to user access of the protected data, as it was prior to the receipt of the disaster preparation script. In an alternative embodiment, step 540 can entail the copying of only selected protected decryption keys and, if appropriate, their associated access information to the off-site server 10. As a further alternative, rather than copying the protected decryption keys and any necessary access information, step 540 could merely verify that at least a recovery key 250 and corresponding protected decryption key 223 are already stored in the off-site storage 355, and copy them if they are not.

Once step 540 has been completed, the algorithmic security of the data can be enhanced in preparation for the disaster by removing one or more of the protected decryption keys from the computing device as shown in step 560. In one embodiment, step 560 entails removal of all protected decryption keys from the computing device. In an alternative embodiment only some protected decryption keys are removed from the computing device. If one or more protected decryption keys are left on the computing device, they should not be able to provide access to the decryption key merely through the use of access information that is already in the user's possession. For example, protected decryption keys that could provide access to the decryption key merely by entering a user-selected password should not be left on the computing device, since the off-site server 350 need not be contacted after the disaster to enable successful access of the protected data.

Once the relevant protected decryption keys are deleted at step 560, the computing device can be shut down as shown by step 570. Nothing further then need occur until after the disaster has passed, as shown by step 580.

Figure 7:
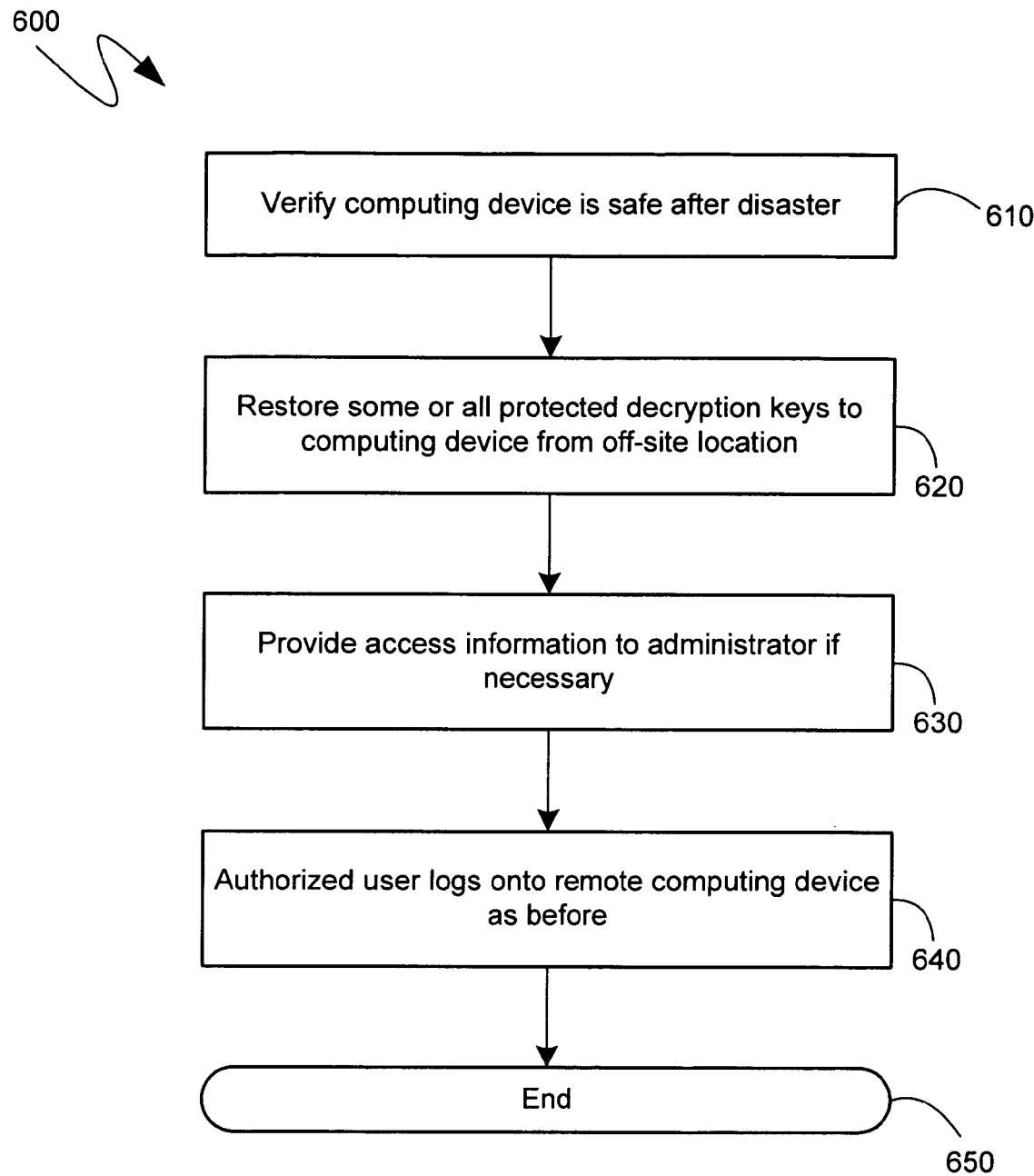
FIG. 7 is a flow diagram illustrating a disaster recovery process.

After the disaster has passed, the more appropriate algorithmic security that was previously in place prior to the disaster can be restored via the steps of flow diagram 600, illustrated in FIG. 7. Initially, at step 610, the off-site server 350 can verify that the computing device is safe after the disaster. As described above, such verification can take the form of network communications, preferably secure network communications, between the computing device and the off-site server. Such verification can also take the form of telephonic conversation or even in-person inspections, as also described above.

Once the physical security of the computing device in the wake of the disaster has been verified, the off-site server 350 can, at step 620, restore some or all of the protected decryption keys back onto the computing device. As described previously, in one embodiment, the off-site server 350 restores all of the protected decryption keys back onto the computing device, enabling access of the protected data in an identical manner to that used prior to the disaster. In an alternative embodiment, the off-site server 350 restores only selected protected decryption keys. Because much of the hard disk drive 141 of the computing device may be encrypted, the protected decryption keys, in order to be accessible, can be stored in a specific location on the hard drive, such as the location that maintains the metadata for the encrypted volume. Once restored, a user can get access to the protected data with a password that, in combination with one of the restored protected decryption keys, will provide the user access to the decryption key 220.

Rather than restoring some or all of the protected decryption keys at step 620, the off-site server 350 could instead restore only protected decryption key 223 that, in combination with the recovery key 250, can provide access to the decryption key 220. Subsequently, the off-site server 350 can provide the recovery key 250 to the administrator of the computing device if the administrator is not already in possession of such information. The user can, with the appropriate access information, such as was either previously known to the user, or was obtained from an administrator, access the protected data.

As can be seen from the above descriptions, an off-site service can prepare computing devices for a disaster by removing some or all of the keys needed to decrypt the data on such computing device, and returning some or all of those keys only after the disaster has passed and the physical integrity of the computing system can be verified. The off-site service can be in the form of a centralized service provided to branch locations of a corporate intranet. Alternatively, the off-site service can be in the form of a web-based service that could be offered for sale to anyone. As yet another alternative, the off-site service could simply make use of a peer-to-peer network by which one peer, such as one branch server that is not expected to be affected by a disaster, can implement the above mechanisms to protect computing devices in another branch that is expected to be affected by a disaster. In view of the many possible variations of the subject matter described herein, we claim as our invention all such embodiments as may come within the scope of the following claims and equivalents thereto.

We claim:

1. One or more computer-readable storage media comprising computer-executable instructions for strengthening algorithmic protection of data on a computing device in preparation for a disaster at the computing device, the computer-executable instructions directed to steps comprising:

comparing, to protected decryption keys stored in a location remote from the computing device, multiple protected decryption keys that are stored on the computing device, the multiple protected decryption keys being able to be decrypted into at least one decryption key that can be used to access algorithmically protected data on the computing device;

copying, to the location remote from the computing device, if the comparing reveals that none of the multiple protected decryption keys are equivalent to any of the protected decryption keys stored in the location remote from the computing device, at least one of the multiple protected decryption keys and a corresponding key that can decrypt the copied at least one of the multiple protected decryption keys into the at least one decryption key;

removing at least some of the multiple protected decryption keys from the computing device, such that the removing leaves at least one protected decryption key that can be decrypted into the at least one decryption key that can be used to access the algorithmically protected data on the computing device, and wherein the removing the at least some of the multiple protected decryption keys strengthens the algorithmic protection of data; and algorithmically protecting at least some data on the computing device such that an associated key required to algorithmically unprotect the data has not previously been used by the computing device to access the data.

2. The computer-readable storage media of claim 1, wherein the computer-executable instructions are further directed to steps comprising: verifying that the computing device comprises algorithmically protected data; and, if the computing device does not comprise algorithmically protected data, algorithmically protecting at least some data on the computing device.

3. The computer-readable storage media of claim 1, wherein the associated key is exclusively stored at the off-site location.

4. The computer-readable storage media of claim 1, wherein the computer-executable instructions are further directed to steps comprising: shutting down the computing device.

5. One or more computer-readable storage media comprising computer-executable instructions for decreasing algorithmic protection of data following a disaster, the computer-executable instructions directed to steps comprising:

receiving, from a computing device affected by the disaster, and that comprises algorithmically protected data stored on the computing device prior to the disaster, a network communication comprising at least one identifier utilized to verify that the computing device is physically secure;

transmitting, in response to the receiving, at least one key that can be used to access the algorithmically protected data on the computing device, to the computing device, the at least one key not having previously been stored on the computing device; and transmitting, in response to the receiving, instructions to the computing device for storing the at least one key in a predetermined area of the computing device where such keys would be automatically identified by the computing device upon startup, wherein the storing of the at least one key decreases the algorithmic protection of data.

6. The computer-readable storage media of claim 5, wherein the computer-executable instructions are further directed to steps comprising: transmitting, in response to the receiving, all keys that were previously stored on the computing device, which were removed from the computing device in anticipation of the disaster; wherein the predetermined area is an area of the computing device from which the keys were removed in anticipation of the disaster.

7. The computer-readable storage media of claim 5, wherein the computer-executable instructions are further directed to steps comprising: transmitting data necessary for the computing device to access the at least one key.

8. The computer-readable storage media of claim 5, wherein the at least one key is different from keys previously used to access algorithmically protected data on the computing device.

9. The computer-readable storage media of claim 5, wherein the at least one key was generated for providing recovery access to algorithmically protected data on the computing device.

10. A method for strengthening algorithmic protection of data on a computing device in preparation for a disaster at the computing device, the method comprising:

comparing, to protected decryption keys stored in a location remote from the computing device, multiple protected decryption keys that are stored on the computing device, the multiple protected decryption keys being able to be decrypted into at least one decryption key that can be used to access algorithmically protected data on the computing device;

copying, to the location remote from the computing device, if the comparing reveals that none of the multiple protected decryption keys are equivalent to any of the protected decryption keys stored in the location remote from the computing device, at least one of the multiple protected decryption keys and a corresponding key that can decrypt the copied at least one of the multiple protected decryption keys into the at least one decryption key;

removing at least some of the multiple protected decryption keys from the computing device, such that the removing leaves at least one protected decryption key that can be decrypted into the at least one decryption key that can be used to access the algorithmically protected data on the computing device, and wherein the removing the at least some of the multiple protected decryption keys strengthens the algorithmic protection of data; and receiving, from the computing device, a network communication comprising at least one identifier utilized to verify that the computing device is physically secure;

transmitting, in response to the receiving, at least one key that can be used to access the algorithmically protected data on the computing device, to the computing device after the disaster, the at least one key not having previously been stored on the computing device; and transmitting, in response to the receiving, instructions to the computing device after the disaster for storing the at least one key in a predetermined area of the computing device where such keys would be automatically identified by the computing device upon startup, wherein the storing of the at least one key decreases the algorithmic protection of data.

11. The method of claim 10, further comprising: shutting down the computing device.

12. The method of claim 10, further comprising: transmitting, in response to the receiving, to the computing device after the disaster, all keys, previously used to access the algorithmically protected data on the computing device, which were removed from the computing device in anticipation of the disaster.

13. The method of claim 10, further comprising: transmitting, to the computing device after the disaster, data necessary for the computing device to access the at least one key.

14. The method of claim 10, wherein the at least one key is different from keys previously used to access algorithmically protected data on the computing device.

\* \* \* \* \*